United States Patent [19]

Bauer

[11] Patent Number: 5,026,081
[45] Date of Patent: Jun. 25, 1991

[54] REAR WHEEL STEERING SYSTEM HAVING TOE ERROR COMPENSATION

[75] Inventor: Harry J. Bauer, Troy, Mich.
[73] Assignee: General Motors Corporation, Detroit, Mich.
[21] Appl. No.: 470,005
[22] Filed: Jan. 25, 1990
[51] Int. Cl.$^5$ .............................................. B62D 7/14
[52] U.S. Cl. ...................................... 280/91; 280/99; 280/661
[58] Field of Search ................. 280/91, 661, 699, 718, 280/724, 692

[56] References Cited

U.S. PATENT DOCUMENTS

| | | |
|---|---|---|
| 4,614,359 | 9/1986 | Lundin et al. ........................ 280/661 |
| 4,695,073 | 9/1987 | Pettibone et al. .................... 280/661 |
| 4,874,183 | 10/1989 | Chikuma et al. ....................... 280/91 |

Primary Examiner—Richard A. Bertsch
Attorney, Agent, or Firm—Mark A. Navarre

[57] ABSTRACT

A rear wheel steering mechanism capable of independently positioning the rear wheels of a vehicle also independently corrects the toe error of each steered wheel. In the preferred embodiment, each rear wheel is steered by a separate actuator. The overall steering command for the actuators is determined at least in relation to the front steering angle, the command being constrained within predefined command limits. The actuators, on the other hand, have a control range which exceeds that of the predefined command limits. The controller which generates the steering commands is adapted to receive and store signals representing the toe error of each rear wheel from a conventional wheel alignment machine, and the controller causes the actuator to position each rear wheel as a combined function of the steering command and the respective stored toe error signals. When realignment becomes necessary, an alignment machine is connected to the controller, and the system enters a reset mode in which the rear wheels are steered to a "straight ahead" position independent of the previously stored toe error values, and the newly measured toe error values are stored for future steering control.

3 Claims, 2 Drawing Sheets

REAR WHEEL STEERING SYSTEM HAVING TOE ERROR COMPENSATION

The present invention is directed to a rear wheel steering system, and more particularly to a system which individually compensates for the toe error of each rear wheel.

BACKGROUND OF THE INVENTION

Vehicles with four wheel independent suspensions generally require the adjustment of rear toe angles during the wheel alignment process. This adjustment typically involves manually lengthening or shortening a toe-link bar with a wrench to effect sufficient inward or outward toe movement to bring the toe angles within a specified error window.

Also well known in the art are steering systems which position the rear wheels of a vehicle in relation to the front wheel steering angle, sometimes in combination with the vehicle speed. In most systems, a single actuator or mechanical input positions both rear wheels via a steering rack or similar mechanism. Independent positioning of the rear wheels is also known.

SUMMARY OF THE PRESENT INVENTION

The present invention is directed to an improved system in which a rear wheel steering mechanism capable of independently positioning the rear wheels of a vehicle also independently corrects the toe error of each steered wheel. According to the preferred embodiment, each rear wheel is steered by a separate actuator. The steering command for the actuators is determined at least in relation to the front steering angle, the command being constrained within predefined command limits. The actuators, on the other hand, have a control range which exceeds that of the predefined command limits. The controller which generates the steering commands is adapted to receive and store signals representing the toe error of each rear wheel from a conventional wheel alignment machine, and the controller causes the actuator to position each rear wheel as a combined function of the steering command and the respective stored toe error signals.

When realignment becomes necessary, an alignment machine is connected to the controller, and the system enters a reset mode in which the rear wheels are steered to a "straight ahead" position independent of the previously stored toe error values, and the newly measured toe error values are stored for future steering control.

DETAILED DESCRIPTION OF THE DRAWINGS

Figure 1:
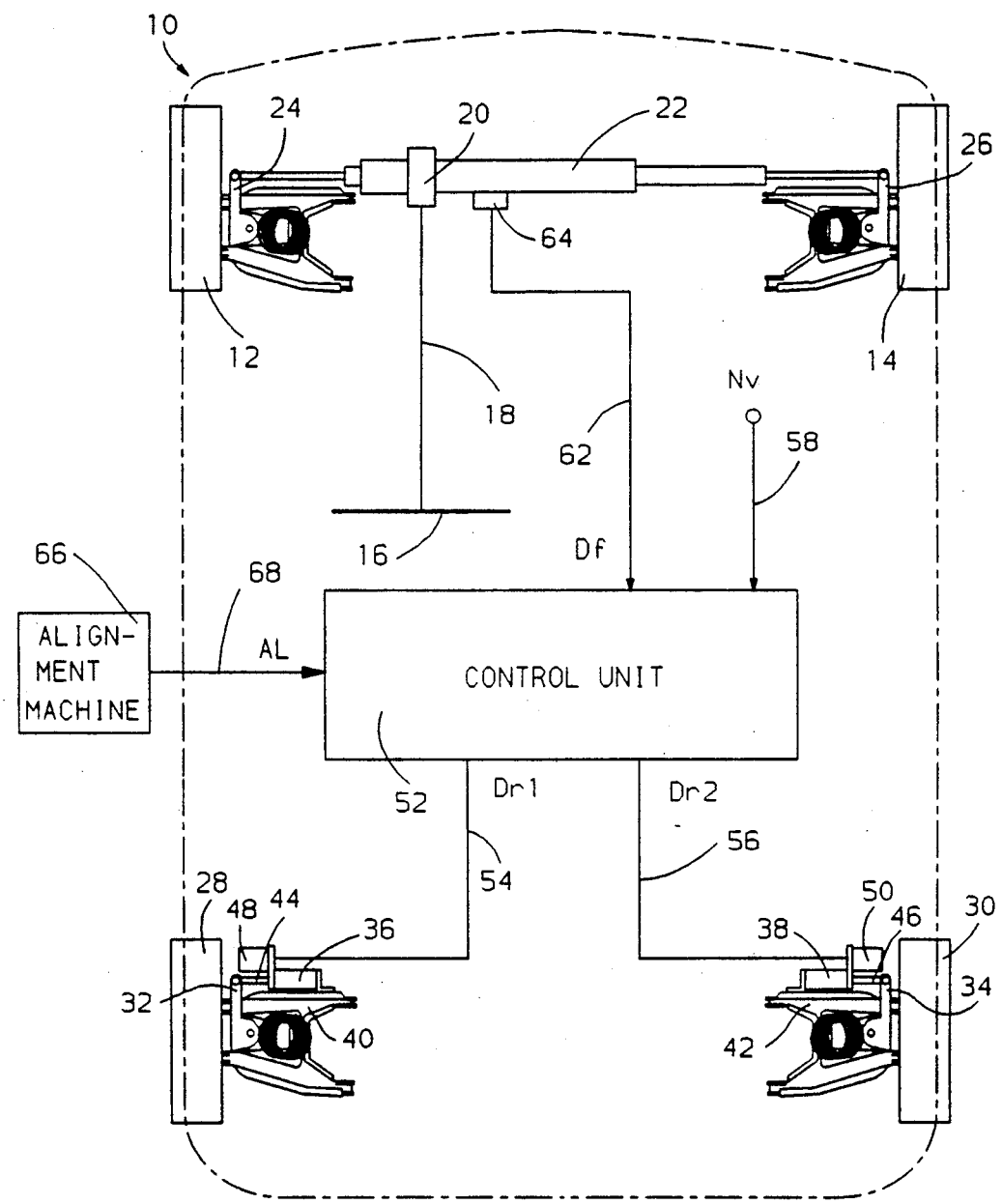
FIG. 1 is a schematic diagram of a vehicle rear wheel steering system according to this invention, including a computer-based controller.

Referring to FIG. 1, the reference numeral 10 generally designates a motor vehicle having four steerable wheels suspended from the vehicle on conventional ball joint mechanisms. The front wheels 12, 14 are steered together in response to rotation of an operator manipulated handwheel 16. The handwheel 16 is mechanically connected via steering column 18 to a pinion gear 20, which is maintained in meshing engagement with teeth formed on a rack member 22. The rack member 22, in turn, is connected to the front wheel steering knuckles 24 and 26, completing the mechanical linkage connecting the front wheels 12, 14 to the handwheel 16. The steering of the front wheels 12, 14 may be assisted by a conventional hydraulic power assist steering system or by an electric power assist system, such as that shown in the U.S. Pat. No. 4,509,611 to Kade et al. issued Apr. 9, 1985, and assigned to the assignee of the present invention.

The rear wheels 28, 30 are also provided with steering knuckles 32, 34 for effecting limited independent positive and negative steering of the same. Each rear wheel assembly includes a linear actuator 36, 38 mounted on a lower control arm 40, 42 and having an output linkage 44, 46 connected to the respective steering knuckles 32, 34. Each such output linkage 44, 46 is axially displaceable by an electric motor 48, 50, operating through a generally conventional ball-screw mechanism (not shown).

A computer-based controller 52 develops separate position control signal Dr1 and Dr2 for the rear wheels 28 and 30, and applies such signals to the electric motors 48 and 50 via lines 54 and 56. In carrying out such control, electrical signals indicative of vehicle speed Nv and front wheel steering angle Df are supplied as inputs to control unit 52 via lines 58 and 62. The vehicle speed signal Nv may be obtained with a conventional variable reluctance magnetic speed pickup (not shown), and the front steering angle signal Df may be obtained with a conventional position sensor 64 responsive to the displacement of rack member 22. Additional position sensors responsive to the displacement of the actuator output linkages 44, 46 may also be provided for control purposes if desired.

In normal operation, the control unit 52 develops a single overall rear wheel steering command Dr as a function of the front wheel steering angle Df and the vehicle speed Nv. The individual rear actuator commands Dr1 and Dr2 are then determined according to the difference of the steering command Dr and stored toe error signals for each rear wheel 28, 30. Algebraically, $$Dr1 = Dr - TE1, \text{ and}$$

$$Dr2 = Dr - TE2$$

where TE1 and TE2 represent the toe error values for the wheels 28 and 30, respectively.

An alignment machine, designated by the reference numeral 66 measures the toe error of each rear wheel 28, 30 and communicates the error information to control unit 52 via the serial data bus 68. Originally, the machine 66 represents equipment installed at the final assembly point of the vehicle 10; later, the machine 66 may be a dealer or service station installed alignment apparatus. In either event, the machine 66 measures the toe error of each wheel 28, 30 and transmits a corresponding signal AL to control unit 52 in accordance with a predefined protocol. In response, the control unit 52 enters a calibration mode in which the rear wheels are steered to a straight (zero steering angle) position, independent of the previously stored toe error values, if any. Once in the calibration mode, the control unit 52 stores the toe error values transmitted by the machine 66, completing the alignment procedure. Once the machine 66 is disconnected from the control unit 52, the normal control mode is entered, and the rear wheels are steered as a combined function of the normal overall steering command Dr and the respective stored toe error signals TE1, TE2.

Figure 2:
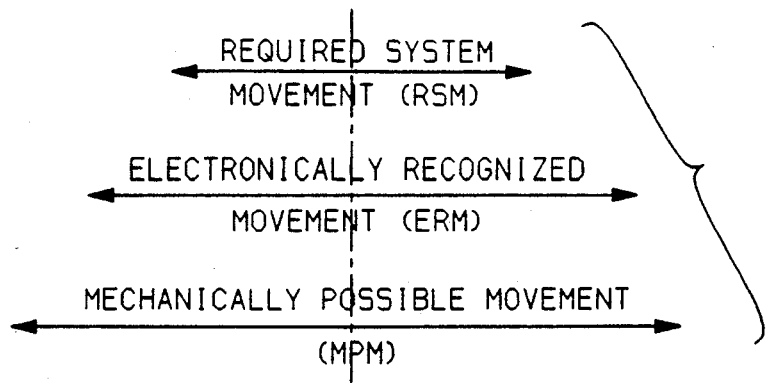
FIG. 2 is a line diagram illustrating three related steering movement ranges.

To superimpose a toe error correction on the rear steering system depicted in FIG. 1, certain dimensional relationships must exist. To illustrate this point, the line diagram of FIG. 2 defines three related steering movements: the required system movement (RSM), the electronically recognized movement (ERM), and the mechanically possible movement (MPM). The RSM is the actuator movement range required for the normal rear wheel steering function. The ERM is the actuator movement range which the control unit 52 is capable of commanding. Since the ERM is greater than the RSM, the control unit 52 can command a steering angle which is greater than the most severe steering command Dr generated in normal rear wheel steer operation. This enables the control unit 52 to compensate for a toe error opposite in sign to the steering command Dr, even under the most severe steering situations. The MPM is the mechanical limit of actuator movement. By design, the MPM is greater than the ERM in order to avoid steering operation in the area of the mechanical actuator limits. In an exemplary system, the RSM is sufficient to permit steering movement of ±4 degrees; the ERM is sufficient to permit steering movement of ±4.5 degrees; and the MPM is sufficient to permit steering movement of ±6 degrees.

Figure 3:
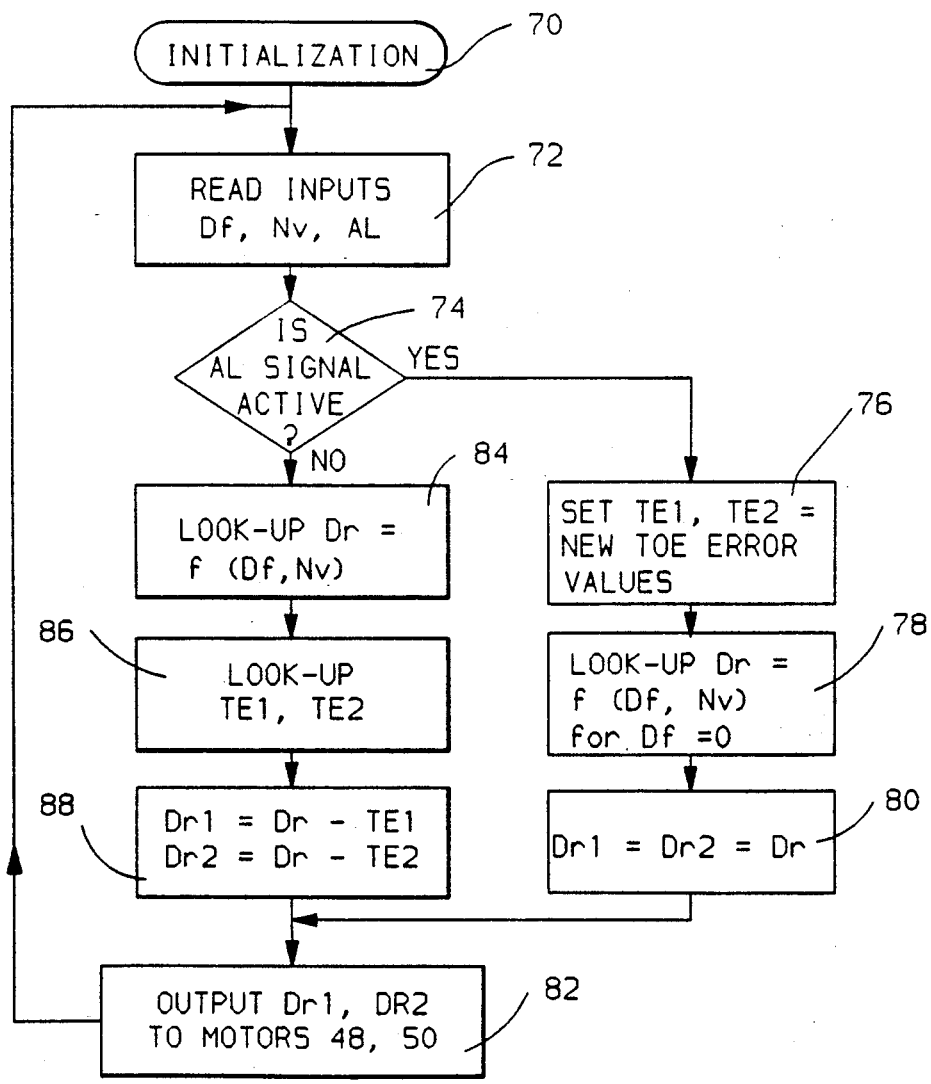
FIG. 3 is a flow diagram representative of a computer program executed by the controller of FIG. 1 in carrying out the control of this invention.

The flow diagram of FIG. 3 represents program instructions executed by the computer-based control unit 52 in carrying out the control method of this invention. The block 70 designates a series of initialization instructions executed at the initiation of each period of vehicle operation for initializing the registers and variables used by control unit 52. Thereafter, the remaining blocks are sequentially and repeatedly executed as indicated by the flow diagram lines.

Following initialization, the block 72 is executed to read the alignment signal AL and the inputs representing the measured vehicle speed Nv and front steering angle Df. If the alignment signal AL is active, as determined at block 74, the control enters a calibration mode in which the blocks 76–82 are executed to (1) set the toe error variables TE1, TE2 equal to the new toe error values encoded in the alignment signal AL, (2) look-up the "straight ahead" steering command Dr, (3) set the rear steer commands Dr1 and Dr2 equal to the steering command Dr, and (4) output the rear steering commands Dr1, Dr2 to the motors 48, 50. The steering command look-up refers to a conventional 3D look-up table technique in which the overall rear steer command Dr is stored as a combined function of the front steering angle Df and the vehicle speed Nv. In the calibration mode, the term Df is set to zero as indicated at block 78. This sequence of steps is repeated so long as the alignment signal AL is active.

When the alignment signal AL is no longer active, the control enters a normal steering mode in which the blocks 84–88 and 82 are executed to (1) look-up the normal overall steering command Dr as a function of the measured front steering angle Df and vehicle speed Nv, (2) look-up the stored toe error values TE1, TE2, (3) compute the rear steer commands Dr1 and Dr2 in relation to the normal overall steering command Dr and the toe error terms TE1 and TE2, respectively, and (4) output the rear steering commands Dr1, Dr2 to the motors 48, 50. In this mode, the stored toe error values TE1, TE2 are combined with the overall steering command Dr, to thereby provide a continuous compensation for the toe errors of the individual rear wheels 28 and 30.

Whenever re-alignment becomes necessary, the calibration procedure described above is simply repeated at a dealer or service station. Such a re-alignment may also involve a calibration of the rack position sensor 64 (depending on the sensor technology) to ensure that the signal Df is "zeroed" when the front wheels 12, 14 are steered straight.

In addition to the automatic toe error adjustment described above, the linkages 44, 46 preferably include a mechanical displacement adjustment mechanism so that a toe adjustment may be made by the conventional manual method in the event that a suitable alignment machine is not accessible.

While this invention has been described in reference to the illustrated embodiment, it is expected that various modifications will occur to those skilled in the art. In this regard, it should be understood that systems incorporating such modifications may fall within the scope of this invention, which is defined by the appended claims.

The embodiments of the invention in which an exclusive property or privilege is claimed are defined as follows:

1. In a system for steering the rear wheels of a motor vehicle including control means for developing a rear wheel steering command within predefined command limits, and actuator means for independently steering the rear wheels in relation to the steering command within predefined actuator limits, the improvement wherein:

the predefined actuator limits exceed the predefined command limits, the control means is adapted to receive and store signals representing the toe error of each rear wheel, and the actuator means steers each rear wheel as a combined function of the steering command and the respective stored toe error signals.

2. A system for steering the rear wheels of a motor vehicle, comprising:

first and second actuator means for individually steering first and second rear wheels in relation to first and second steering commands applied thereto, and control means including means effective in a calibration mode to receive and store first and second toe error signals representing the toe error of the first and second rear wheel, respectively, and means effective in a normal mode for applying first and second steering commands to said first and second actuator means, the first and second steering commands being determined as a combined function of an overall rear wheel steering command and the respective stored first and second toe error signals.

3. A system for steering the rear wheels of a motor vehicle, comprising:

first and second actuator means for individually steering first and second rear wheels in relation to first and second steering commands applied thereto;

control means adapted for electrical connection with a toe error measurement apparatus capable of electrically transmitting signals corresponding to measured toe error values for said first and second rear wheels, the control means including (a) means effective in response to the receipt of an electrical transmission from said toe error measurement apparatus for (1) applying first and second steering commands to said first and second actuator means for steering said first and second wheels in a straight orientation and (2) storing the transmitted signals corresponding to the measured toe error values of said first and second wheels respectively; and (b) means effective upon disconnection of said toe error measurement apparatus for applying first and second steering commands to said first and second actuator means to steer the first and second wheels as a combined function of an overall rear wheel steering command and the respective stored first and second toe error values, thereby to individually compensate for the measured toe errors.

* * * * *